United States Patent [19]
Eskildsen

[11] Patent Number: 5,576,977
[45] Date of Patent: Nov. 19, 1996

[54] FILTER FOR ELIMINATING THE EFFECTS OF FLUORESCENT LIGHTS ON MICROWAVE TRANSCEIVERS

[75] Inventor: Kenneth Eskildsen, Oakland Gardens, N.Y.

[73] Assignee: Alarm Device Manufacturing Company, Syosset, N.Y.

[21] Appl. No.: 429,631

[22] Filed: Apr. 27, 1995

[51] Int. Cl.$^6$ ................................. G08B 13/00
[52] U.S. Cl. .................. 364/572; 364/724.17; 367/44; 340/554; 342/28
[58] Field of Search ................... 340/541, 554; 348/662, 665, 667, 668; 364/572

[56] References Cited

U.S. PATENT DOCUMENTS

| | | | |
|---|---|---|---|
| 4,322,722 | 3/1982 | Kozdon | 340/554 |
| 4,395,126 | 7/1983 | Kramer | 356/417 |
| 4,399,454 | 8/1983 | Warnock et al. | 358/16 |
| 4,484,182 | 11/1984 | Schofield et al. | 340/552 |
| 4,488,240 | 12/1984 | Kapadia et al. | 364/508 |
| 4,625,199 | 11/1986 | Pantus | 340/522 |
| 4,797,949 | 1/1989 | Stites, III | 455/230 |
| 4,868,573 | 9/1989 | Wittmer | 341/157 |
| 5,093,656 | 3/1992 | Dipoala | 340/522 |
| 5,266,954 | 11/1993 | Orlowksi et al. | 342/69 |

*Primary Examiner*—Emanuel T. Voeltz
*Assistant Examiner*—Demetra R. Smith
*Attorney, Agent, or Firm*—Meltzer, Lippe, Goldstein, et al.

[57] ABSTRACT

A filter for eliminating the effects of fluorescent lights on microwave transceivers uses a digital comb filter to eliminate signals at the AC power line frequency and its harmonics. A preferred embodiment has an A/D converter or sampler for sampling and digitizing an output signal from a microwave transceiver. The digitized signal is processed by a processor which implements the digital comb filter by performing a recursion equation. The inventive filter may also have a selector for selecting the sampling frequency. By selecting a desired sampling frequency, the filter may be easily adapted to filter out a different AC power line frequency. Thus, the inventive filter is easily adaptable for use in different countries having different AC power line frequencies.

24 Claims, 5 Drawing Sheets

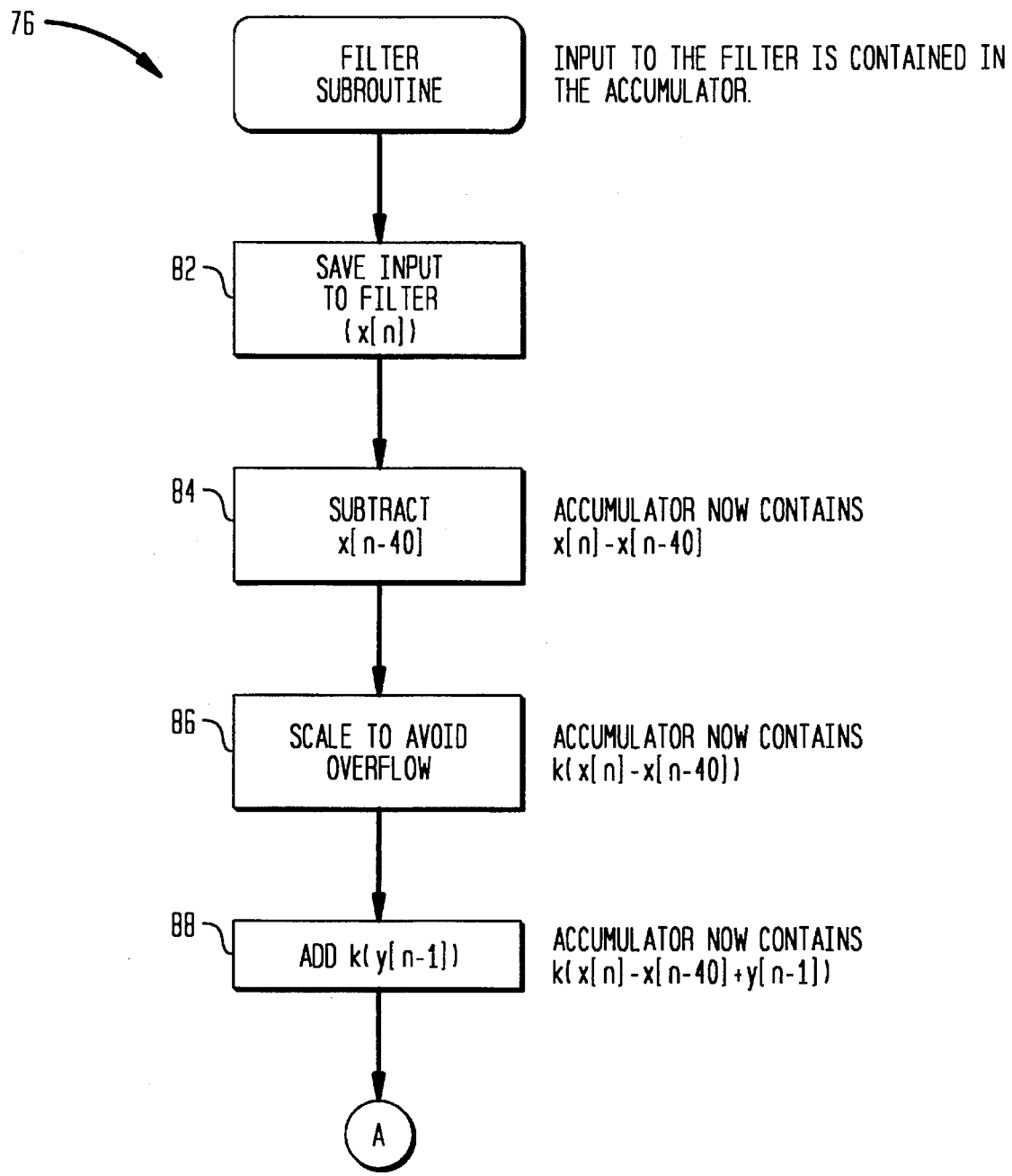

5,576,977

FILTER FOR ELIMINATING THE EFFECTS OF FLUORESCENT LIGHTS ON MICROWAVE TRANSCEIVERS

FIELD OF THE INVENTION

The present invention is directed to a filter for a microwave transceiver and, more particularly, to a filter for a microwave transceiver which filters out signals caused by fluorescent lights.

BACKGROUND OF THE INVENTION

Motion detectors often use microwave transceivers, passive infrared detectors, or both to sense motion. A microwave transceiver creates an energy field of microwave energy having a particular carrier frequency. The energy field is called the "field of view" of the transceiver. The microwave transceiver monitors this field of view and detects motion by phase changes in the received carrier frequency. When the phase of the received carrier frequency of the monitored signal changes, motion, such as the presence of the intruder, is detected.

One such motion detector is illustrated in FIG. 1. A motion detector 20 is mounted in the corner of a room. The motion detector includes at least a microwave transceiver 22 which creates a field of microwave energy 24. A fluorescent light fixture 26 is present in this field 24. The fixture 26 contains a fluorescent light tube 28. This tube includes gas which, when electrons are passed through it, generates light.

One problem which has been known to those skilled in the art is that fluorescent lights located within the microwave transceiver's field of view often cause false alarms. That is, the microwave transceiver "detects" motion even though there is no motion in the field. This is because the discharge of electrons in the fluorescent light tube (i.e., the motion of electrons through the gas in the light tube) gives a false motion signal by shifting the phase of the received carrier frequency of the monitored signal. This phase change in the received carrier frequency is caused by energy at multiples of the AC power line frequency. Most of this energy occurs at twice the AC power line frequency (i.e., the first harmonic). This energy causes the microwave transceiver 22 to falsely "detect" motion.

One known prior art solution to this problem is illustrated in FIG. 2. FIG. 2 is a block diagram of a motion detector 20. A microwave transceiver (DRO) 22 outputs to a doppler amplifier section 34 a signal at a doppler frequency. The doppler frequency represents the phase change in the received carrier frequency due to motion of an object in the field of view. The doppler amplifier section 34 amplifies the output of the DRO 32 for further processing. The amplified signal is then filtered through a hardware-based notch filter 36. The notch filter 36 is designed to have a center frequency at twice the AC power line frequency, i.e., the first harmonic of the main frequency. In the United States, where the electricity supplied by the AC power lines has a frequency of 60 Hz, the first harmonic of this frequency is at 120 Hz.

The signal output from the notch filter 36 is then applied to a processor 38, such as a microprocessor, to process the signal as required by the motion detector 20. The processor may, for example, determine that motion has been detected and, in response, generate a signal which may turn on a light or activate an alarm.

There are several drawbacks to this design. First, the notch filter 36 comprises discrete hardware components which are often imprecise and drift with temperature, time, and age. This imprecision causes the filter to have its "center frequency" at a frequency above or below 120 Hz, thus not effectively filtering out the first harmonic of the AC power line. Thus it fails to eliminate "false positive" signals. Second, the notch filter 36 only eliminates one component of the "false positive" signal. As mentioned above, the greatest energy emitted by the fluorescent light is at the first harmonic of the AC power lines, e.g., 120 Hz in the United States. However, the fluorescent light emits energy at the main AC power line frequency and other harmonics, as well. Thus, energy may also be emitted at 60 Hz, 180 Hz, 240 Hz, 300 Hz, etc. The prior art notch filter does not eliminate signals caused by the energy of the main frequency and these other harmonics. Third, to use the device in foreign countries having an AC power frequency other than 60 Hz, the hardware-based notch filter must be redesigned to have a different center frequency. For example, in the United Kingdom and other European countries, the AC power frequency line is 50 Hz. Thus, the filter must be designed to have a center frequency at 100 Hz to filter out the first harmonic of the 50 Hz AC power line frequency.

Thus, it is an object of the present invention to provide a filter for eliminating the effects of fluorescent lights on microwave transceivers.

It is another object of the present invention to provide a filter which will be precisely tuned to the frequencies to be eliminated.

It is a further object of the present invention to provide a filter which eliminates all signals transmitted due to the AC power lines including the center frequency and all its harmonics.

It is yet a further object of the present invention to provide a filter which is easily adaptable for use in countries having an AC power frequency different from the United States'.

SUMMARY OF THE INVENTION

These and other objects are achieved by a filter according to the present invention wherein a digital filter is used to filter out the AC power line frequency and its harmonics. By eliminating these frequencies, false positive "detections" by microwave transceivers are avoided. In one embodiment of the present invention, a digital comb filter is used to filter a microwave transceiver's output signal. This filter comprises a sampler and a processor such as a microprocessor.

The sampler samples the signal output from the microwave transceiver at a predetermined frequency and outputs the sampled signal to the processor. The predetermined frequency of the sampler may be selected to be a multiple of the frequency to be filtered out, such as the alternating current power line frequency. In a preferred embodiment, the predetermined frequency is forty times the alternating current power line frequency. The processor filters the sampled signal by performing a recursion equation on the sampled signal and outputs the filtered signal.

The digital filter further comprises a frequency selector configured to select the predetermined frequency from a plurality of frequencies. Illustratively, the frequency selector applies a signal to the processor which may be a high or a low voltage. Depending on the level of this voltage, the processor selects one of two predetermined sampling frequencies. These sampling frequencies may be, for example, multiples of the U.S. and European AC power line frequencies.

In another embodiment of the present invention, a motion detector comprises a microwave transceiver which creates and monitors a field of microwave energy. A doppler amplifier receives and amplifies the output of the microwave transceiver. A processor receives the amplified signal from the doppler amplifier. The processor includes a sampler and a digital comb filter connected to the sampler. The sampler samples the amplified signal at a predetermined frequency. The digital comb filter filters the sampled signal by performing a recursion equation on the sampled signal. As with the first embodiment, an accumulator and a frequency selector may be provided.

Another embodiment of the present invention is a method for filtering a microwave transceiver output signal. The inventive method comprises the steps of sampling the output signal at a predetermined frequency; filtering the sampled signal by performing a recursion equation on the sampled signal; and generating a filtered output signal.

The inventive digital comb filter is capable of being easily and precisely tuned to eliminate undesired frequencies. The digital comb filter is easily adaptable for use in foreign countries having different AC power line frequencies by means of the selector which shifts the center frequency of the digital comb filter between two predetermined center frequencies.

BRIEF DESCRIPTION OF THE DRAWINGS

The present invention is described with reference to the following figures:

FIGS. 6a and 6b are a flow chart of a filtering subroutine shown in FIG. 5 in accordance with the present invention.

DETAILED DESCRIPTION OF PREFERRED EMBODIMENTS

Figure 1:
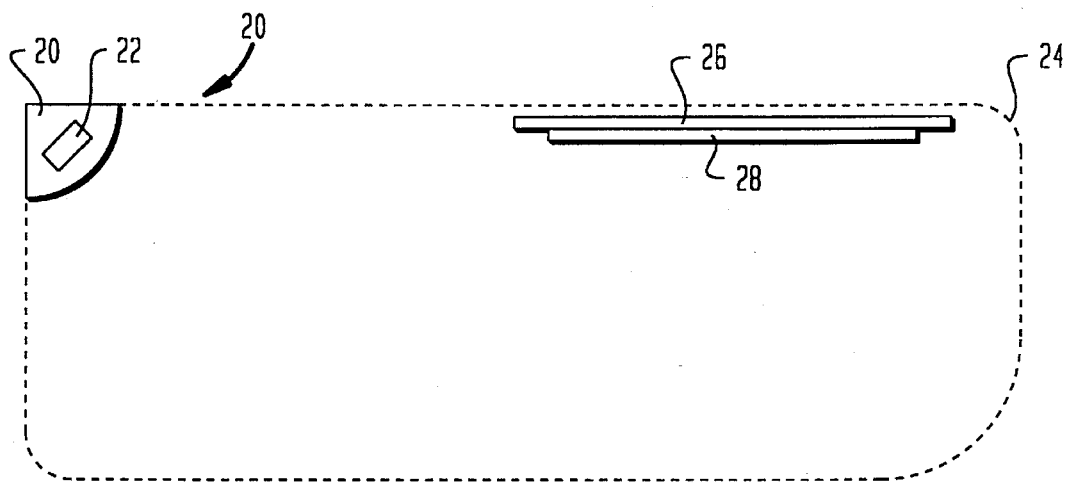
FIG. 1 illustrates a motion detector having a microwave transceiver.
Figure 2:
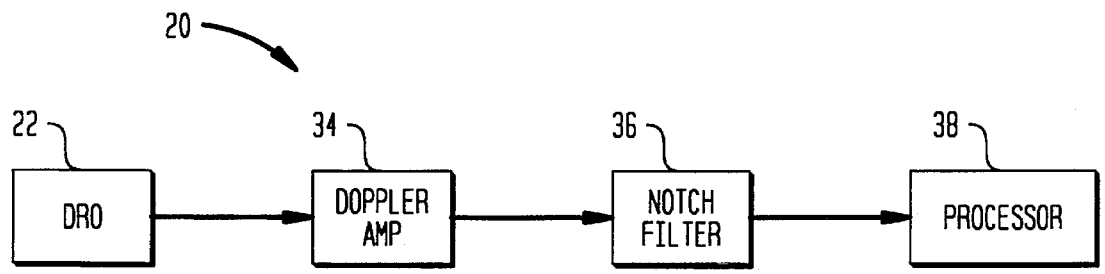
FIG. 2 is a block diagram of a prior an motion detector.
Figure 3:
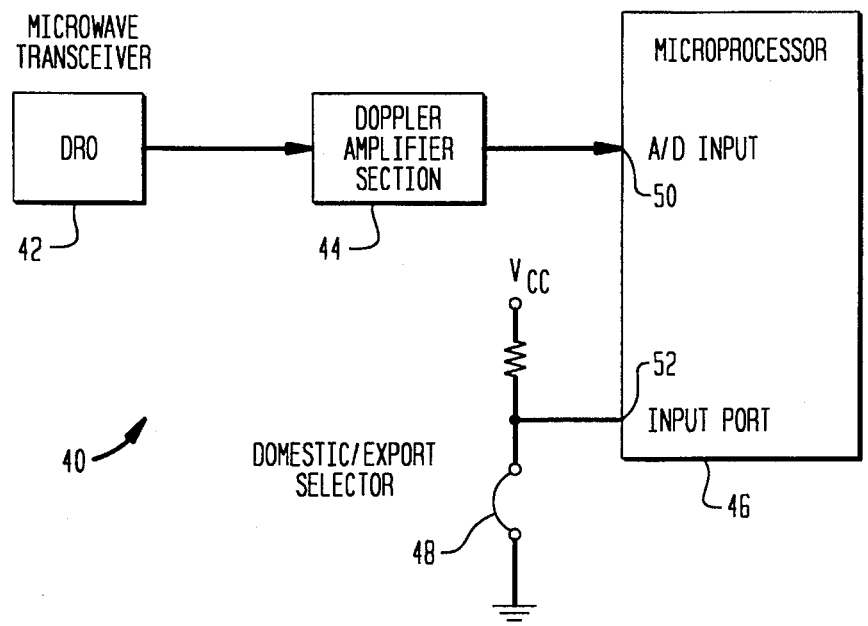
FIG. 3 is a block diagram of an illustrative embodiment of the present invention.

FIG. 3 is a block diagram of an illustrative embodiment of the present invention. A motion detector 40 has a DRO 42, a doppler amplifier section 44, a processor 46, such as a microprocessor, and a domestic/export selector 48.

The microwave transceiver 42 sends an output signal to the doppler amplifier 44, which amplifies the signal. The signal is applied to an analog-to-digital (A/D) converter input 50 of the processor 46 for filtering and processing. A domestic/export selector 48 is connected to an input port 52 of the processor 46 to change the center frequency of the filtering which occurs in the processor 46. Illustratively, the selector 48 selects from two positions. However, more than two positions may be incorporated. The processor 46 implements a digital comb filter algorithm.

Illustratively, the selector 48 applies a one bit logic level having one of two values to the input port 52, a logic high or a logic low. These logic values may be provided by digital AND/OR gates for example. The selector 48 may output more than one bit, having four values such as "00", "01", "10", and "11", to select among four predetermined sampling frequencies.

Preferably, the selector 48 is a jumper that has two positions; a closed position to provide a logic low and an open position to provide a logic high. In the closed position, the jumper grounds the input port 52 of the microprocessor 46. In the open position, the jumper pulls up the input port 52 to Vcc through a pull up resistor. The microprocessor 46 detects the voltage or logic level as its input port 52 and accordingly sets the proper sampling frequency. Alternatively, the selector 48 may be a zero ohm resistor, a wire, or other structure which shorts the input port 52 to ground. The wire may be soldered on the board that contains the components of the motion detector 40.

The proper sampling frequencies are predetermined depending on the status of the selector 48. Thus, when the selector 48 provides a logic high, e.g., the jumper is in the open position (where the input port 52 is pulled up to Vcc), then the microprocessor 46 selects a first sampling rate to be used by a sampler 62, such as an A/D converter, for digitizing or sampling the analog signal received at the A/D port 50 of the microprocessor 46. When the selector 48 is in the other position, e.g., the jumper is in the closed position (where the input port 52 is grounded), then the microprocessor 46 selects a second sampling rate. How these sampling rates are chosen is described below.

Figure 4:
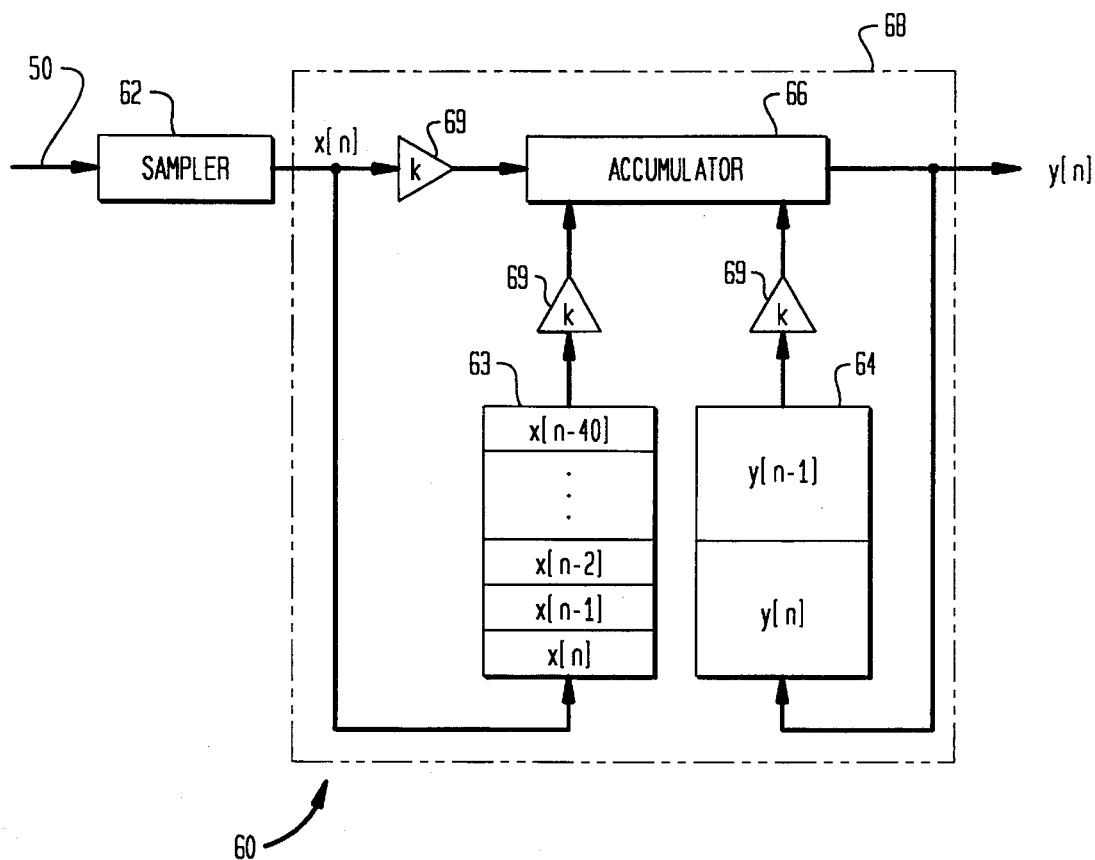
FIG. 4 is a block diagram of the filter components of the processor shown in FIG. 3 in accordance with the present invention.

FIG. 4 is a block diagram of the filter components 60 simulated by the processor 46. The filter 60 includes a sampler 62, such as an A/D converter, and a digital comb filter 68. The digital comb filter 68 comprises two delay lines 63, 64, which may be, for example, memory storage devices such as a RAM (random access memory), and an accumulator 66. The digital comb filter 68 is implemented in the processor 46. This implementation may be done with firmware or software. The digital comb filter 68 may also include scalers 69. The sampler 62 receives the analog signal via the A/D input 50.

The sampler 62 samples the signal at a particular frequency and converts the signal into discrete binary values. These values are stored in the first delay line 63. Illustratively, the first delay line 63 stores values of the sampled signal from the current value x[n] to the value forty samples prior x[n–40]. The accumulator 66 is connected between the delay lines 63, 64 and the digital comb filter 68 and temporarily stores values (e.g., values of calculations and samples) to be processed by the digital comb filter 66.

The second delay line 64 stores the current output y[n] of the digital comb filter 66. The second delay line 64 delays the current output y[n] to provides the previous output y[n–1]. The second delay line 64 is also connected to the accumulator 66 for supplying values of the previous output y[n–1] needed by the digital comb filter 68 for determining the current output y[n].

The scalers 69 may be used to scale inputs to the accumulator 66 to avoid overflow.

The digital comb filter 66 receives the sampled signal and filters out frequencies that are a particular fraction of the sampling frequency. In a preferred embodiment of the present invention, the fraction is 1/40. Thus, all frequencies that are 1/40th of the sampling frequency, and multiples of 1/40th of the sampling frequency, are filtered out. Thus, the sampling frequency in this preferred embodiment is chosen to be forty times the AC power frequency, because it is a multiple of the frequencies which are to be filtered out. In the United States, the preferred sampling frequency is 40 * 60 Hz=2400 Hz. In Europe, the preferred sampling frequency is 40 * 50 Hz=2000 Hz.

Figure 5:
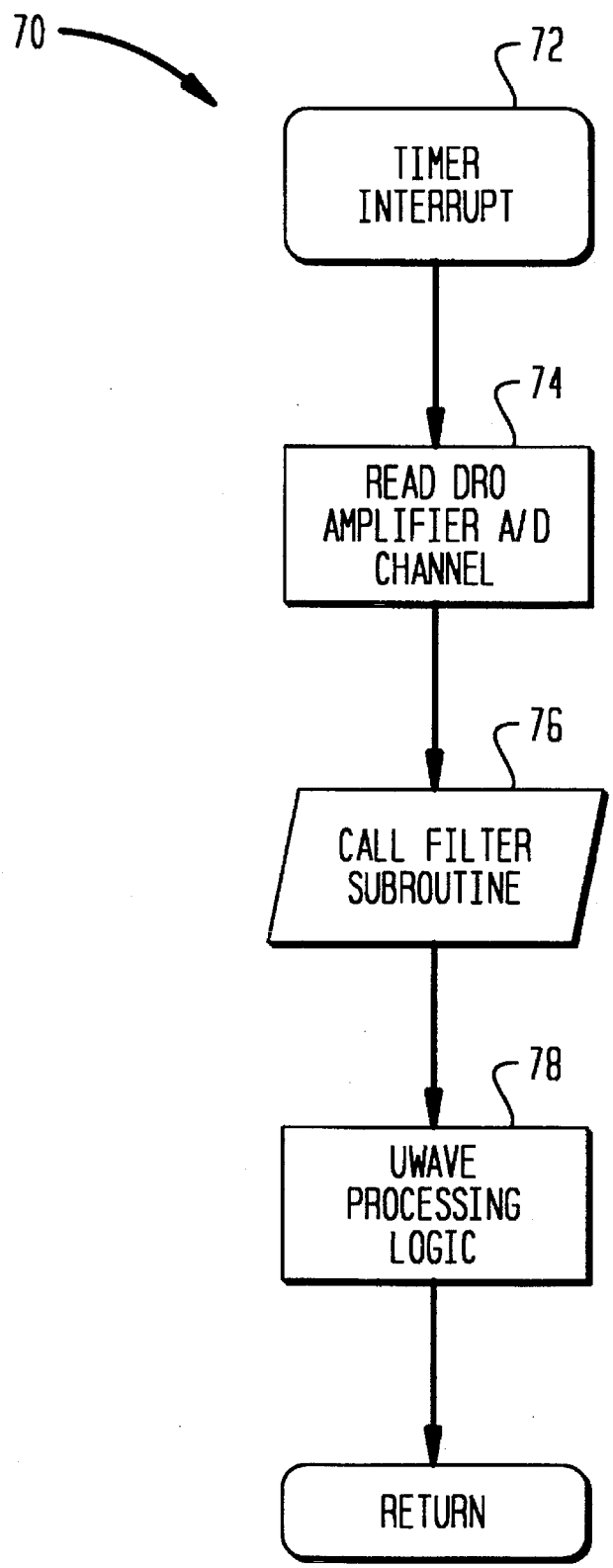
FIG. 5 is a flow chart of a process performed according to the present invention.

FIG. 5 is a flow chart of a preferred process 70 performed by a motion detector 20 using a filter according to the present invention. A timer interrupt (step 72) determines the sampling rate of the sampler 62. The sampler 62 reads the output of the doppler amplifier 44 (step 74) which is applied to the A/D input 50 of the processor 46. In the embodiment where the accumulator 64 is connected between the sampler 62 and the digital comb filter 66, the sampled signal is stored in the accumulator 64. A filtering subroutine, described in relation to FIGS. 6a and 6b below, is performed (step 76). The filtered signal is then subjected to conventional microwave processing logic (step 78).

Figure 6B:
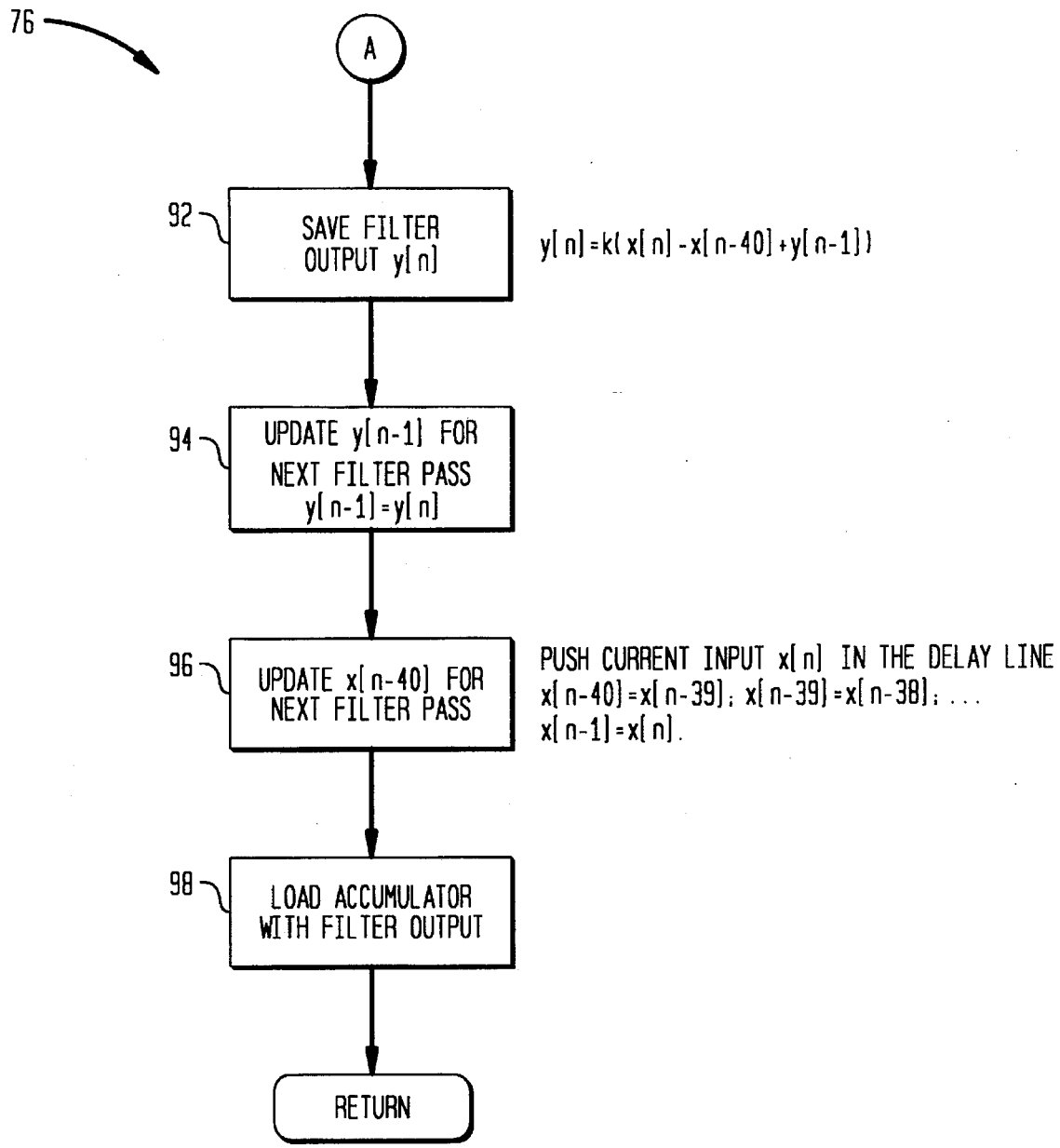

FIGS. 6a and 6b are a flow chart of the filtering subroutine (step 76). Illustratively, the filter 60 performs a z-transform in accordance with the filtering subroutine which is based on the following filter z-transform function:

$$H(z) = \frac{1 - z^{-40}}{(1 - z^{-1})k'}$$

This transfer function H(z) has been found to be a preferred transfer function. Other equations may work as well. Preferably, k' has a value of 64. The transfer function H(z) is based on the following filter recursion equation:

$$y[n]=x[n]-x[n-40]+y[n-1]$$

where:

x[n] is the current signal sample;

x[n–40] is a signal sample taken 40 samples before the current signal sample;

y[n] is the current filter output;

y[n–1] is the output of the filter for the previous signal sample.

Referring to FIGS. 6a and 6b, the current signal sample x[n] is saved in the accumulator 64 (step 82). The signal taken forty samples ago x[n–40] is subtracted from the current signal sample x[n] (step 84). The accumulator 64 now contains the difference of {x[n]–x[n–40]}. If the number of bits in this difference exceeds the number of bits which may be handled by the processor 46, then the difference is scaled to avoid overflow (step 86). This means that the difference is multiplied by a scaling constant "k" to yield a scaled difference {k(x[n]–x[n–40])} which does not exceed the maximum allowable number of bits. A preferred value for k is ½. Illustratively, for an 8 bit processor, the sum of two 8 bit numbers may result in a 9 bit number, i.e., one bit larger than may be handled by an 8 bit processor. To overcome this overflow problem, the resulting 9 bit number is multiplied by ½ to yield a scaled 8 bit output.

The filter output from the previous signal sample y[n–1] (which, if necessary, may also be scaled by multiplying it by the scaling constant "k" to yield a scaled filter output {k(y[n–1])}), is added to the difference which may be scaled as explained above (step 88). At this point, the accumulator 64 contains {k (x[n]–x[n–40]+y[n–1])}, which is the output y[n] of the filter, scaled to avoid overflow, as defined by the recursion equation for the filter. Scaling of the filter output y[n], by multiplying it by the scaling constant "k" or another scaling constant, may be repeated if necessary to avoid overflow.

For the next signal sample, the filter output y[n] is saved for use as the y[n–1] and the current y[n–1] is discarded (step 92). The previous filter output y[n–1] is updated by setting it equal to the current filter output y[n] (step 94). Next, the current sample x[n] becomes x[n–1] and all previous samples are "moved" one increment; that is, x[n–40] of the previous pass is discarded and x[n–39] of the previous pass becomes x[n–40] for the next signal sample (step 96). The filter output y[n] is placed in the accumulator (step 98), where it is used by the processor 46 for the conventional microwave processing.

This invention has many advantages. The invention effectively eliminates the main frequency and all the harmonics of the AC power lines radiated, for example, from fluorescent lights. This avoids the effects of fluorescent lights on microwave transceivers and reduces false alarms due to erroneous detection of motion when no such motion exists. The inventive digital comb filter eliminates the drifting from the center frequency associated with analog and/or hardware implemented filters. The inventive filter is versatile and easily adaptable for filtering different frequencies. This allows using the inventive filter under various environments, such as in countries having different AC power line frequencies. The inventive filter is easily adapted for use in different countries by properly positioning its frequency selector.

In addition, the inventive digital comb filter is easily adapted and precisely tuned to eliminate undesired frequencies. The digital comb filter may be implemented by firmware or software loaded in the microprocessor. Therefore, changes in the filtering characteristics are easily implemented without the need for hardware changes. This drastically reduces the cost of customizing and re-tuning the inventive filter. Maintenance of the inventive filter is also reduced, as digital systems generally require less maintenance than analog systems. In addition, because the inventive filter is digital, it can easily interface with other digital systems, such as alarms.

Finally, the above described embodiment of the invention are intended to be illustrative only. Numerous alternative embodiments may be devised by those skilled in the an without departing from the spirit and scope of the following claims.

I claim:

1. A digital comb filter for filtering a signal output from a microwave transceiver, comprising:

a sampler connected to receive the signal output from the microwave transceiver and configured to sample the signal at a predetermined frequency;

a processor connected to receive the sampled signal and configured to filter the sampled signal by performing a recursion equation on the sampled signal; and an output connected to output the filtered signal.

2. The digital comb filter of claim 1, wherein the predetermined frequency of the sampler being selected is a multiple of a frequency to be filtered out.

3. The digital comb filter of claim 1, wherein the sampler further comprises a frequency selector configured to select the predetermined frequency from a plurality of frequencies.

4. The digital comb filter of claim 3, wherein the frequency selector is configured to apply a signal to the processor.

5. The digital comb filter of claim 4, wherein the frequency selector is configured to apply one of a high and a low voltage to the processor, wherein the processor is configured to respond to the high voltage to select a first frequency and to the low voltage to select a second frequency.

6. The digital comb filter of claim 5, wherein the frequency selector comprises:

a resistor connected between a voltage source and a ground; and a switch connected between the resistor and the ground.

7. The digital comb filter of claim 6, wherein the switch is one of a zero ohm resistor and a jumper.

8. The digital comb filter of claim 1, wherein the processor is a microprocessor.

9. The digital comb filter of claim 1, wherein the processor is configured to perform the following recursion equation:

$$y[n]=x[n]-x[n-40]+y[n-1];$$

where y[n] is a value of an output of the digital comb filter for a current signal sample;

x[n] is a value of a current signal sample;

x[n−40] is a value of a signal sample taken 40 samples prior to the current signal sample; and y[n−1] is a value of an output of the digital comb filter for a sample taken just prior to the current signal sample.

10. The digital comb filter of claim 1, wherein the predetermined frequency is a multiple of an alternating current (AC) power line frequency.

11. The digital comb filter of claim 1, wherein the predetermined frequency is forty times the AC power line frequency.

12. The digital comb filter of claim 1, wherein the processor further includes a random access memory device connected to receive the sampled signal and to receive the filtered signal from the output and configured to store sampled signal values and filtered signal values.

13. A motion detector, comprising:

a microwave transceiver configured to create and monitor a field of microwave energy and to generate an output signal;

a doppler amplifier connected to receive and amplify the output signal and to output an amplified signal; and a processor including:
 a sampler connected to receive and sample the amplified signal at a predetermined frequency; and
 a digital comb filter connected to receive and filter the sampled signal by performing a recursion equation on the sampled signal.

14. The motion detector of claim 13, wherein the predetermined frequency is selected to be a multiple of an alternating current power line frequency.

15. The motion detector of claim 14, wherein the predetermined frequency is selected to be forty times the alternating power line frequency.

16. The motion detector of claim 15, wherein the recursion equation is:

$$y[n]=x[n]-x[n-40]+y[n-1];$$

where y[n] is a value of an output of the digital comb filter for a current signal sample;

x[n] is a value of a current signal sample;

x[n−40] is a value of a signal sample taken 40 samples prior to the current signal sample; and y[n−1] is a value of an output of the digital comb filter for a sample taken just prior to the current signal sample.

17. The motion detector of claim 13, further comprising a frequency selector connected to the processor and configured to select the predetermined frequency from a plurality of frequencies.

18. The motion detector of claim 17, wherein the frequency selector is configured to apply a signal to the processor.

19. The motion detector of claim 18, wherein the frequency selector is configured to apply one of a high and a low voltage to the processor, wherein the processor is configured to respond to the high voltage to select a first frequency and to the low voltage to select a second frequency.

20. A method for filtering a microwave transceiver output signal, comprising the steps of:

sampling the output signal at a predetermined frequency;

filtering the sampled signal by performing a recursion equation on the sampled signal; and generating a filtered output signal.

21. The method of claim 20, further comprising before sampling the output signal, selecting the predetermined frequency from a plurality of frequencies.

22. The method of claim 21, wherein the step of selecting further comprises selecting the predetermined frequency to be a multiple of an alternating current power line frequency.

23. The method of claim 22, wherein the step of selecting further comprises selecting the predetermined frequency to be forty times the alternating current power line frequency.

24. The method of claim 20, wherein the step of filtering comprises performing the following recursion equation:

$$y[n]=x[n]-x[n-40]+y[n-1];$$

where y[n] is a value of the filtered output signal for a current sampled output signal;

x[n] is a value of a current sampled output signal;

x[n−40] is a value of a sampled output signal taken 40 samples prior to the current sampled output signal; and y[n−1] is a value of a filtered output signal for a sampled output signal taken just prior to the current signal sample.

* * * * *